(12) United States Patent
Mohamed et al.

(10) Patent No.: US 11,487,391 B2
(45) Date of Patent: Nov. 1, 2022

(54) TOUCH SENSING DEVICE AND METHOD FOR MULTI-DRIVING

(71) Applicant: SILICON WORKS CO., LTD., Daejeon (KR)

(72) Inventors: Mohamed Gamal Ahmed Mohamed, Daejeon (KR); Jun Seop Lee, Daejeon (KR); Mun Seok Kang, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/126,720

(22) Filed: Dec. 18, 2020

(65) Prior Publication Data

US 2021/0200349 A1 Jul. 1, 2021

(30) Foreign Application Priority Data

Dec. 27, 2019 (KR) .................... 10-2019-0176679

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
USPC ........................................................ 345/174
See application file for complete search history.

(56) References Cited

U.S. PATENT DOCUMENTS

| | | | |
|---|---|---|---|
| 9,811,214 B2 | 11/2017 | Forlines et al. | |
| 10,019,125 B2 | 7/2018 | Forlines et al. | |
| 10,168,849 B2 | 1/2019 | Forlines et al. | |
| 10,551,985 B2 | 2/2020 | Forlines et al. | |
| 2010/0253647 A1* | 10/2010 | Agari | G06F 3/0446 345/174 |
| 2012/0056841 A1* | 3/2012 | Krenik | G06F 3/04182 345/174 |
| 2013/0127779 A1* | 5/2013 | Lillie | G06F 3/04166 345/173 |
| 2013/0215004 A1* | 8/2013 | Nordlinder | G06K 19/06056 427/58 |
| 2013/0257790 A1* | 10/2013 | Chen | G06F 3/044 345/174 |
| 2014/0198053 A1* | 7/2014 | Yoon | G06F 3/047 345/173 |
| 2014/0340351 A1 | 11/2014 | Forlines et al. | |
| 2015/0301651 A1* | 10/2015 | Leigh | G06F 3/042 345/174 |
| 2015/0370401 A1* | 12/2015 | Mizuhashi | G02F 1/13338 345/174 |
| 2016/0117051 A1* | 4/2016 | Han | G06F 3/04166 345/173 |
| 2016/0231854 A1* | 8/2016 | Koo | G06F 3/047 |
| 2017/0024052 A1* | 1/2017 | Jota Costa | G06F 3/04166 |

(Continued)

FOREIGN PATENT DOCUMENTS

KR 10-2016-0011617 A 2/2016
KR 10-2019-0136309 A 12/2019

*Primary Examiner* — Chineyere D Wills-Burns
(74) *Attorney, Agent, or Firm* — Fenwick & West LLP

(57) ABSTRACT

The present disclosure provides a touch sensing device reducing the touch driving time and the signal to noise ratio (SNR) by a multi-driving using driving signals that can be distinguished from each other by their frequencies and codes.

9 Claims, 15 Drawing Sheets

(56) References Cited

U.S. PATENT DOCUMENTS

| | | |
|---|---|---|
| 2017/0262092 A1* | 9/2017 | Wu ........................ G06F 3/0445 |
| 2017/0315655 A1* | 11/2017 | Weinerth ............... G06F 3/0446 |
| 2018/0032179 A1 | 2/2018 | Forlines et al. |
| 2018/0074641 A1* | 3/2018 | Tanaka .................. G06F 3/0418 |
| 2018/0253183 A1* | 9/2018 | Imanilov ............. H04L 27/2615 |
| 2018/0292931 A1 | 10/2018 | Forlines et al. |
| 2018/0329542 A1 | 11/2018 | Forlines et al. |
| 2019/0102021 A1* | 4/2019 | Jang ....................... G06F 3/0383 |
| 2019/0124956 A1* | 5/2019 | Yu ............................. A23L 3/32 |
| 2019/0138133 A1 | 5/2019 | Forlines et al. |
| 2020/0285332 A1 | 9/2020 | Forlines et al. |

* cited by examiner

TOUCH SENSING DEVICE AND METHOD FOR MULTI-DRIVING

CROSS REFERENCE TO RELATED APPLICATION

This application claims priority from Republic of Korea Patent Application No. 10-2019-0176679, filed on Dec. 27, 2019, which is hereby incorporated by reference in its entirety.

BACKGROUND

1. Field of Technology

The present disclosure relates to a technology for sensing a touch.

2. Description of the Prior Art

Position sensors are generally used as input devices for computers, PDAs (Personal Digital Assistants), media players, video game players, home electric appliances, wireless telephones, public phones, POS (point of sales) terminals, automated teller machines. One general position sensor type used for such applications is a touch pad sensor, which can easily be found in an input device of, for example, a laptop computer. A user generally operates a touch pad sensor by moving his/her finger, a stylus, or other stimulating objects around a sensing area of the touch pad sensor. Since a stimulating object generates capacitive effects, inductive effects, or other electrical effects in a carrier signal applied to a detecting area, a position or the proximity of the stimulating object in or to the detecting area may be detected by the carrier signal. Position information detected by the touch pad sensor may be used for moving a cursor or other indicators on a display screen or scrolling what is on a screen, or for other user interface purposes.

Although touch pad sensors have been used for years, engineers continue seeking designs allowing the reduction of production costs and the improvement of the performance of a touch pad sensor. Their recent interests have been mainly aimed at reducing the effect of noise generated by a display screen, a power source, radio frequency interference and/or other sources outside a sensor. Noise reducing techniques such as various types of sampling, filtering, signal processing, shielding, etc. have been successfully implemented to various extents.

Meanwhile, multi-driving has been used for improving the signal to noise ratio (SNR), however the conventional methods for multi-driving have their limits in reducing touch driving time.

SUMMARY

An aspect of the present disclosure is to provide a technology for multi-driving allowing the reduction of touch driving time. Another aspect of the present disclosure is to provide a technology for multi-driving allowing a further improvement of the SNR.

To this end, in an aspect, the present disclosure provides a touch sensing device comprising: a driving circuit to supply a plurality of first frequency driving signals, having a first frequency and respectively representing different codes, and a plurality of second frequency driving signals, having a second frequency and respectively representing different codes, to transmitting electrodes; a receiving circuit to receive a response signal from a receiving electrode coupled with the transmitting electrodes by capacitances; and a processing circuit to obtain a first frequency element corresponding to the first frequency and a second frequency element corresponding to the second frequency from the response signal and to decode the first frequency element and the second frequency element to generate touch raw data for intersection points of the transmitting electrodes and the receiving electrode.

The first frequency and the second frequency may be orthogonal to each other and the plurality of first frequency driving signals may comprise codes orthogonal to each other.

The processing circuit may extract the first frequency element and the second frequency element from a signal obtained by deducting a basic response signal from the response signal, wherein the basic response signal may correspond to a signal formed in the receiving electrode when there is no proximity or touch of an external object.

The basic response signal may be generated according to a pattern previously stored in a memory.

The basic response signal may be generated by converting data for the pattern stored in the memory into an analog signal and adjusting a gain or an offset of the analog signal.

The processing circuit may obtain the first frequency element and the second frequency element using a Fast Fourier Transform (FFT).

A matrix of codes represented by the first frequency driving signals may be identical to a matrix of codes represented by the second frequency driving signals.

The matrix of codes may be a matrix of perfect codes.

The driving circuit may comprise a switching circuit to selectively output a driving high voltage or a driving low voltage and a drive control circuit to supply a drive control signal to the switching circuit and generate the first frequency driving signals and the second frequency driving signals by controlling the switching circuit according to the drive control signal.

The driving circuit may generate the first frequency driving signals and the second frequency driving signals using an exclusive OR (XOR) logic element into one input terminal of which a square wave having a specific frequency is inputted and into the other terminal of which a code value or an inversed code value is inputted.

In another aspect, the present disclosure provides a method of sensing a touch, comprising: supplying a plurality of first frequency driving signals, having a first frequency and respectively representing different codes and a plurality of second frequency driving signals, having a second frequency and respectively representing different codes, to transmitting electrodes; receiving a response signal to the plurality of first frequency driving signals and the plurality of second frequency driving signals from a receiving electrode coupled with the transmitting electrodes by capacitances; obtaining a first frequency element corresponding to the first frequency and a second frequency element corresponding to the second frequency from the response signal; decoding the first frequency element and the second frequency element to generate touch raw data for intersection points of the transmitting electrodes and the receiving electrode; and analyzing the touch raw data to generate touch data including touch coordinates.

In respectively obtaining a first frequency element and a second frequency element, the first frequency element and the second frequency element may be respectively extracted from a signal obtained by deducting a basic response signal from the response signal, wherein the basic response signal may correspond to a signal formed in the receiving electrode when there is no proximity or touch of an external object.

In still another aspect, the present disclosure provides a touch sensing device comprising: a driving circuit to supply at least one first frequency driving signal having a first frequency and at least one second frequency driving signal having a second frequency to transmitting electrodes; a receiving circuit to receive a response signal from a receiving electrode coupled with the transmitting electrodes by capacitances; and a processing circuit to obtain a first frequency element corresponding to the first frequency and a second frequency element corresponding to the second frequency from the response signal, to generate touch raw data for intersection points of the transmitting electrodes and the receiving electrode using the first frequency element and the second frequency element, and to extract a signal corresponding to a third frequency from the response signal to recognize a downlink signal from an active touch pen.

The first frequency, the second frequency, and the third frequency may be orthogonal to each other.

The driving circuit may supply a plurality of first frequency driving signals respectively representing different codes and a plurality of second frequency driving signals respectively representing different codes to the transmitting electrodes and the processing circuit may decode the first frequency element and the second frequency element to generate the touch raw data.

As described above, the present disclosure allows further reducing touch driving time and further improving the SNR in a touch sensing.

DETAILED DESCRIPTION

Figure 1:
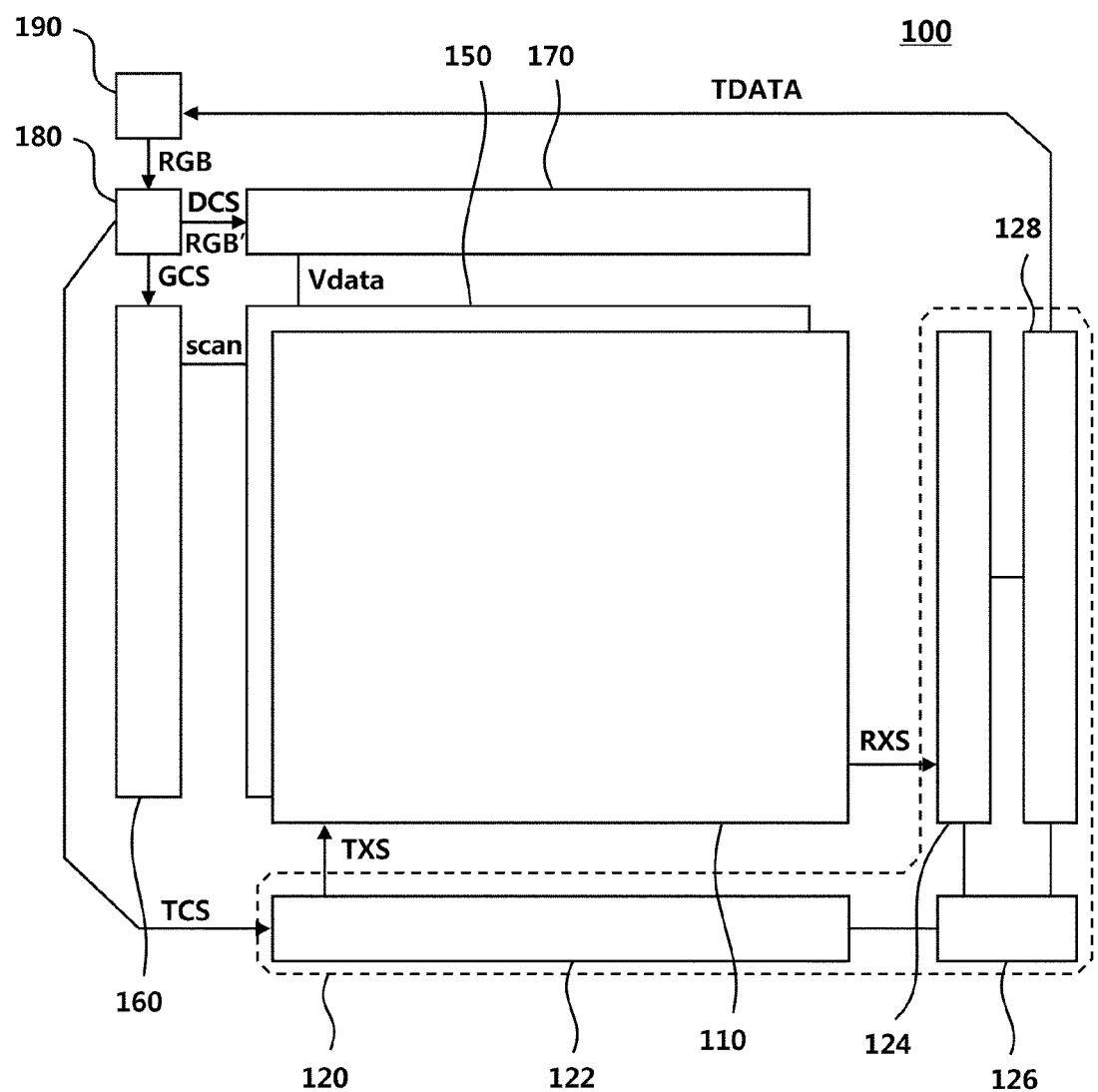
FIG. 1 is a configuration diagram of a display device according to an embodiment.

FIG. 1 is a configuration diagram of a display device according to an embodiment.

Referring to FIG. 1, a display device 100 may comprise a display panel 150, a gate driving device 160, a data driving device 170, a data processing device 180, a host 190, a touch panel 110, and a touch sensing device 120.

The data driving device 170, the gate driving device 160, and the touch sensing device 120 may drive at least one component included in the display panel 150 or the touch panel 110. The data driving device 170 may drive data lines connected with pixels on the display panel 150 and the gate driving device 160 may drive gate lines connected with pixels thereon. The touch sensing device 120 may drive touch electrodes disposed on the touch panel 110.

The data driving device 170 may supply a data voltage through a data line to display an image in each pixel. The data driving device 170 may comprise at least one data driver integrated circuit, and this at least one data driver integrated circuit may be connected to a bonding pad of the display panel 150 in a tape automated bonding (TAB) type or a chip-on-glass (COG) type, directly formed on the display panel 150, or integrated on the display panel 150 depending on cases. In addition, the data driving device 170 may be formed in a chip-on-film (COF) type.

The gate driving device 160 may supply a scan signal through a gate line in order to turn on/off a transistor located in each pixel. The gate driving device 160, depending on driving methods, may be disposed on one side of the display panel 150 as in FIG. 1, or divided into two to be disposed on both sides of the display panel. The gate driving device 160 may comprise at least one gate driver integrated circuit, and this at least one gate driver integrated circuit may be connected to a bonding pad of the display panel 150 in a tape automated bonding (TAB) type or a chip-on-glass (COG) type, implemented in a gate in panel (GIP) type to be directly formed on the display panel 150, or integrated on the display panel 150 depending on cases. In addition, the data driving device 170 may be formed in a chip-on-film (COF) type.

The data processing device 180 may receive image data RGB from the host 190 and convert the image data into a format that the data driving device 170 can recognize. In addition, the data processing device 180 may transmit converted image data RGB' to the data driving device 170.

The data processing device 180 may control timings of the driving devices 160, 170, 120 using control signals GCS, DCS, TCS. In such terms, the data processing device 180 may be referred to as a timing controller.

On the touch panel 110, touch electrodes may be disposed. The touch electrodes may comprise transmitting electrodes and receiving electrodes. The touch sensing device 120 may transmit driving signals TXS to the transmitting electrodes and receive a response signal RXS from a receiving electrode to generate touch data TDATA. The touch sensing device 120 may transmit the touch data TDATA to the host 190. The transmitting electrodes and the receiving electrodes may be the same or different. Although embodiments, in which the transmitting electrodes and the receiving electrodes are different and coupled with each other by capacitances, will be described hereinafter, the present disclosure is not limited thereto.

The touch sensing device 120 may comprise a driving circuit 122, a receiving circuit 124, a controlling circuit 126, and a processing circuit 128. The driving circuit 122 may transmit driving signals TXS to the transmitting electrodes and the receiving circuit 124 may receive response signals RXS from the receiving electrodes. The controlling circuit 126 may transmit timing signals to the driving circuit 122 and the receiving circuit 124. The processing circuit 128 may analyze the response signals RXS to generate touch data TDATA.

The touch sensing device 120 may form a touch system together with the touch panel 110.

Figure 2:
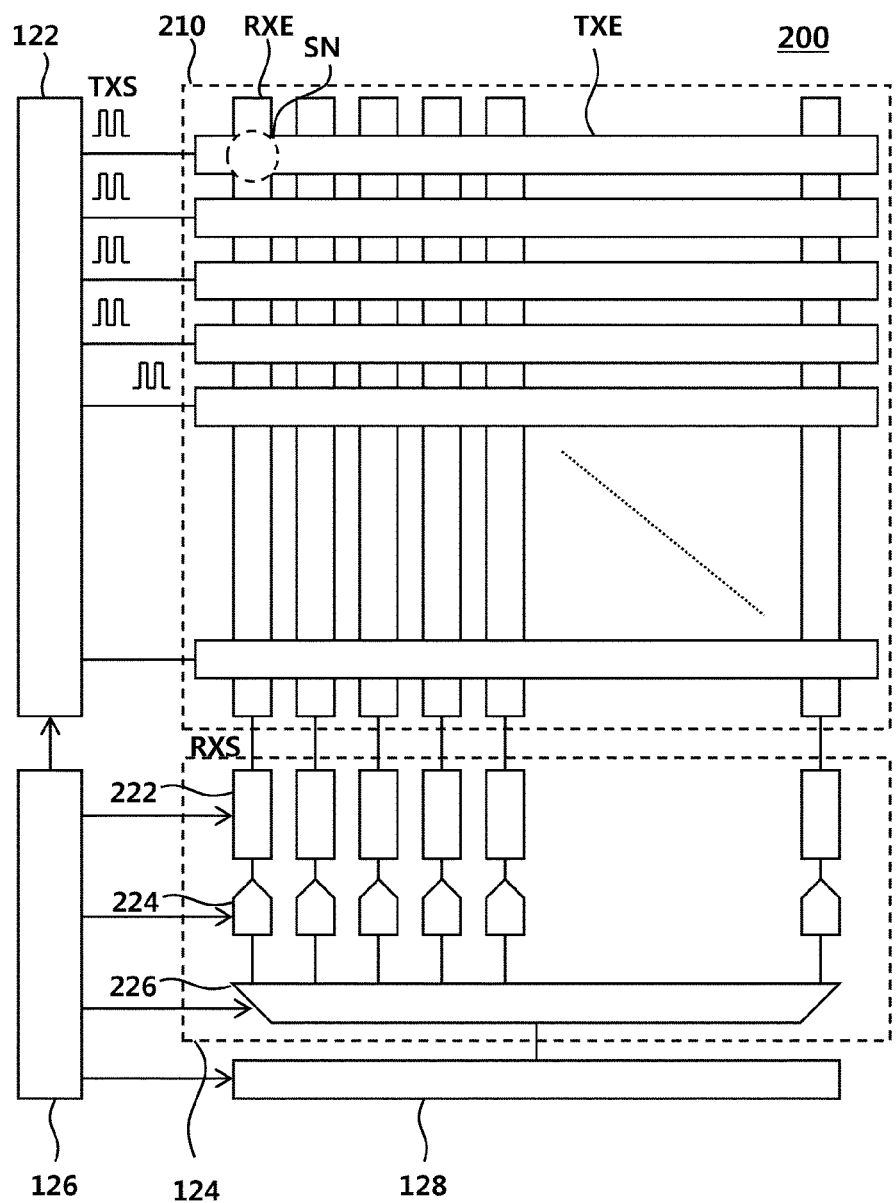
FIG. 2 is a configuration diagram of an example of a touch system according to an embodiment.

FIG. 2 is a configuration diagram of an example of a touch system according to an embodiment.

Referring to FIG. 2, on a touch panel 210, transmitting electrodes TXE and receiving electrodes RXE may be disposed. The transmitting electrodes TXE and the receiving electrodes RXE may be disposed respectively in a transversal direction and a longitudinal direction so as to intersect with each other. The touch panel 210 may have a quadrilateral shape as a whole, however, the present disclosure is not limited thereto.

The driving circuit 122 may supply driving signals TXS to the transmitting electrodes TXE. The receiving circuit 124 may receive response signals RXS from the receiving electrodes RXE and demodulate the response signals RXS to generate touch data TDATA. The transmitting electrodes TXE and the receiving electrodes RXE may be coupled with each other by capacitances, and the driving signals TXS supplied to the transmitting electrodes TXE may induce response signals RXS from the receiving electrodes RXE through the coupling capacitances.

The driving circuit 122 may multi-drive a plurality of transmitting electrodes TXE. Here, multi-driving may mean simultaneously driving the plurality of transmitting electrodes TXE. When a touch system 200 uses multi-driving, since a plurality of transmitting electrodes TXE may simultaneously be driven, the total time for the touch driving may be shortened and the touch sensitivity (signal to noise ratio: SNR) may be improved by making the length of a driving signal TXS supplied to each transmitting electrode TXE longer.

The driving circuit 122 may divide the transmitting electrodes TXE into a plurality of groups and multi-drive the transmitting electrodes TXE by group. For example, in a case when the number of all of the transmitting electrodes TXE disposed on the touch panel 210 is 48, the driving circuit 122 may divide the transmitting electrodes TXE into 12 groups by distributing 4 transmitting electrodes TXE in each group and simultaneously drive the 4 transmitting electrodes assigned in each group.

The driving circuit 122 may simultaneously transmit driving signals modulated to be orthogonal to each other respectively to the transmitting electrodes TXE belonging to one group. Even though a plurality of driving signals TXS modulated to be orthogonal to each other overlap with each other in one response signal RXS, they may be separated through a demodulation process. The receiving circuit 124 may separate influences of a touch for the driving signals TXS by demodulating the response signal RXS received through the receiving electrode RXE.

Here, the driving signals TXS modulated to be orthogonal to each other may be driving signals respectively representing different codes. Such a modulation method is referred to as a code division multiplexing (CDM) method. The respective driving signals TXS have codes orthogonal to each other and when multiplying two codes which are orthogonal to each other, the result may be 0.

The driving circuit 122 may apply a time division driving to each group. The driving circuit 122 may multi-drive a first group in a first time period and a second group in a second time period that does not overlap with the first time period.

The driving circuit 122 may also drive two or more groups simultaneously. For example, the driving circuit 122 may simultaneously drive the first group and the second group in the same time period. Here, a matrix of codes represented by driving signals applied to the first group and a matrix of codes represented by driving signals applied to the second group may be identical.

In order to simultaneously drive two or more groups using an identical matrix of codes, the driving circuit 122 may set frequencies of driving signals applied to the first group to be different from frequencies of driving signals applied to the second group. For example, the driving circuit 122 may supply a plurality of first frequency driving signals, having a first frequency and respectively representing different codes, to transmitting electrodes in the first group and a plurality of second frequency driving signals, having a second frequency different from the first frequency and respectively representing different codes, to transmitting electrodes in the second group. Here, the first frequency and the second frequency may be orthogonal to each other.

The receiving circuit 124 and the processing circuit 128 may separate a response signal to the transmitting electrodes of the first group and a response signal to the transmitting electrodes of the second group from a response signal RXS by a frequency spectrum analysis. In addition, the receiving circuit 124 and the processing circuit 128 may separate a response signal to each transmitting electrode TXE by demodulation (for example, CDM decoding) of a response signal separated by frequency.

The receiving circuit 124 may comprise a readout circuit 222, an analog-digital converter (ADC) 224, and a multiplexer (MUX) 226.

The readout circuit 222, which is to convert a response signal RXS to analog, may comprise a circuit such as an integrator. The analog-digital converter 224 may convert an output from the readout circuit 222 into sensing data. The MUX 226 may transfer sensing data generated in a plurality of channels to the processing circuit 128.

The processing circuit 128 may process the sensing data to generate touch data. For example, the processing circuit 128 may generate touch raw data for an intersection point of a transmitting electrode TXE and a receiving electrode RXE by obtaining a first frequency element corresponding to the first frequency and a second frequency element corresponding to the second frequency from a response signal RXS and decoding the first frequency element and the second frequency element. In addition, the processing circuit 128 may generate touch data including touch coordinates by analyzing the touch raw data.

The controlling circuit 126 may transmit timing signals to the driving circuit 122, the receiving circuit 124, and the processing circuit 128. The driving circuit 122 and the receiving circuit 124 may respectively transmit driving signals TXS and receive response signals RXS according to the timing signals.

The touch system 200 may use a code division multiplexing (CDM) technique as an example of the multi-driving.

The driving circuit 122 may generate driving signals TXS according to a matrix of codes satisfying the CDM and transmit them to respective transmitting electrodes TXE. The receiving circuit 124, particularly, the processing circuit 128 may generate touch raw data by applying a demodulation matrix to sensing data generated depending on response signals RXS. Such processing in the driving circuit 122 is also referred to as a data encoding and the processing in the receiving circuit 124 is also referred to as a data decoding.

Figure 3:
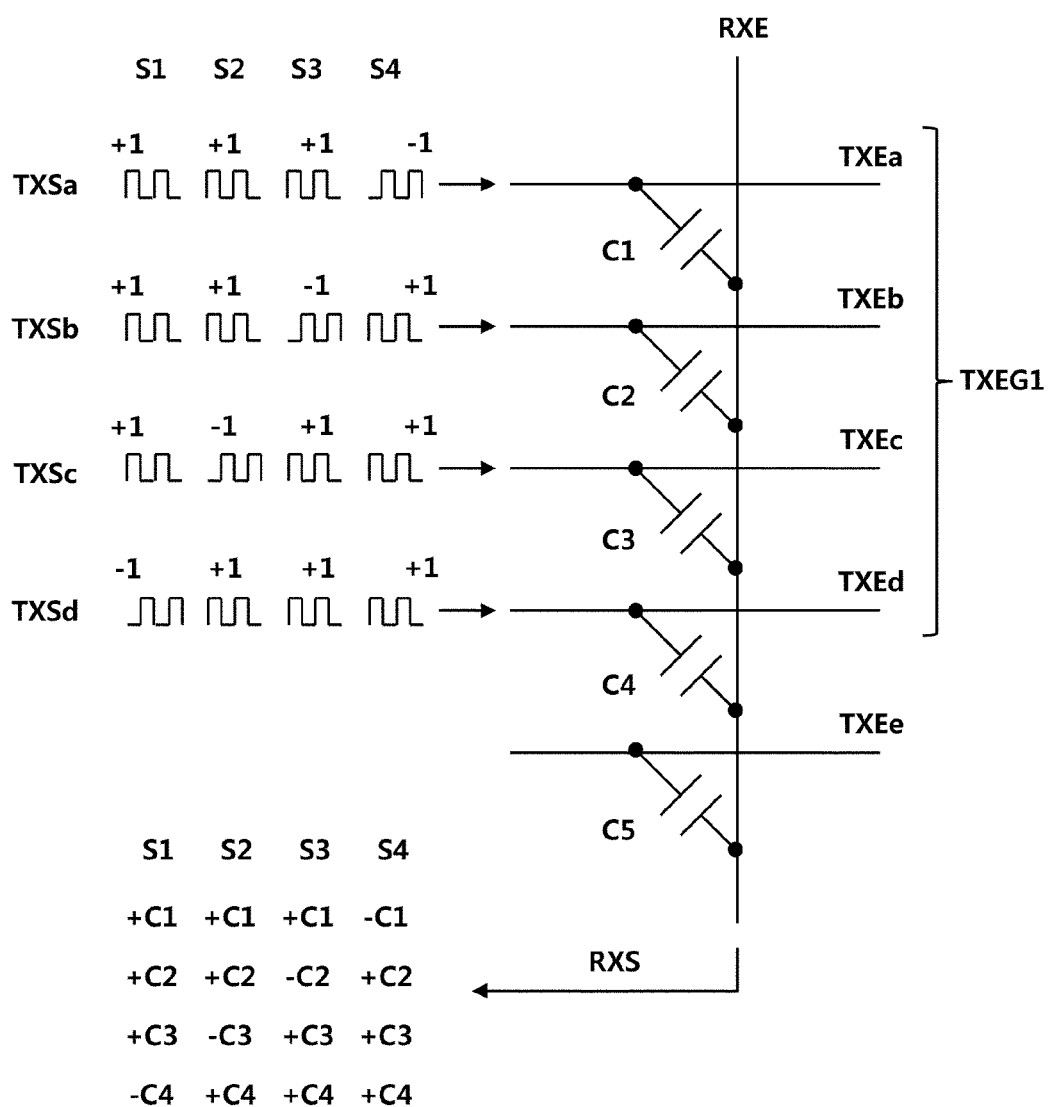
FIG. 3 is a diagram showing an example of a data encoding and a data decoding in a touch system according to an embodiment.

FIG. 3 is an example of a data encoding and a data decoding in a touch system according to an embodiment.

Each driving signal TXSa~TXSd may be divided into N sequences. N is a natural number, and it is 4 in the example of FIG. 3. The driving signals TXSa~TXSd may have specific code values respectively in the respective sequences. In the example of FIG. 3, a first driving signal TXSa may have a code value of (+1) in a first sequence S1 and a code value of (−1) in a fourth sequence S4. Each code value may be generated by a phase modulation (PM), an amplitude modulation (AM), a frequency modulation (FM), etc. In the example of FIG. 3, the code values are generated by the phase modulation (PM). A square wave having a phase shift of 0° is defined as (+1) and a square wave having a phase shift of 180° is defined as (−1).

Referring to FIG. 3, driving signals TXSa~TXSd corresponding to perfect codes are simultaneously transmitted to transmitting electrodes TXEa~TXEd of a first group TXEG1. In the first sequence S1, square waves having a phase shift of 0° indicating (+1) are transmitted to a first transmitting electrode TXEa, a second transmitting electrode TXEb, and a third transmitting electrode TXEc, and a square wave having a phase shift of 180° indicating (−1) to a fourth transmitting electrode TXEd.

When each driving signal TXSa~TXSd transmitted to each transmitting electrode TXEa~TXEd in each sequence S1~S4 is referred to as a code, a response signal RXS of a receiving electrode RXE coupled with the transmitting electrodes TXEa~TXEd by capacitances or sensing data for the response signal RXS may be expressed as a sum of coupling capacitances C1~C4 to which the codes are applied.

For example, sensing data S1 for a response signal RXS in the first sequence S1 may be expressed as (+1)C1+(+1)C2+(+1)C3+(−1)C4.

When generally expressing, sensing data Si in an $i^{th}$ sequence may be expressed as equation 1.

$$S_i = M_{i,1}C_1 + M_{i,1}C_2 + \ldots + M_{i,1}C_L \quad \text{[Equation 1]}$$

Here, i is a natural number and L is a natural number, which is the number of multi-driven driving signals. A matrix of codes transmitted to the transmitting electrodes TXE1~TXE4 in all the sequences S~S4 may be referred to as a code matrix M, and each code may be expressed as $M_{i,j}$. Here, j indicates an order of one of the multi-driven driving signals.

The receiving circuit may receive response signals of all the sequences S1~S4, store them as sensing data, and generate demodulated data by applying an inverse matrix of the code matrix M as a demodulation matrix to the sensing data.

When expressing this as a general equation, it may be expressed as equation 2.

$$[M][C] = [S]$$

$$[S][M]^T = D \quad \text{[Equation 2]}$$

Here, M is a modulation matrix, S is sensing data, C is a coupling capacitance, and D is demodulated data.

An example, in which perfect codes for four transmitting electrodes TXEa~TXEd are applied, is as follows.

$$M = \begin{pmatrix} 1 & 1 & 1 & -1 \\ 1 & 1 & -1 & 1 \\ 1 & -1 & 1 & 1 \\ -1 & 1 & 1 & 1 \end{pmatrix} \quad \text{[Equation 3]}$$

$$\begin{pmatrix} 1 & 1 & 1 & -1 \\ 1 & 1 & -1 & 1 \\ 1 & -1 & 1 & 1 \\ -1 & 1 & 1 & 1 \end{pmatrix} \begin{pmatrix} C_1 \\ C_2 \\ C_3 \\ C_4 \end{pmatrix} = \begin{pmatrix} C_1 + C_2 + C_3 - C_4 \\ C_1 + C_2 - C_3 + C_4 \\ C_1 - C_2 + C_3 + C_4 \\ -C_1 + C_2 + C_3 + C_4 \end{pmatrix}$$

$$\begin{pmatrix} 1 & 1 & 1 & -1 \\ 1 & 1 & -1 & 1 \\ 1 & -1 & 1 & 1 \\ -1 & 1 & 1 & 1 \end{pmatrix}^T \begin{pmatrix} C_1 + C_2 + C_3 - C_4 \\ C_1 + C_2 - C_3 + C_4 \\ C_1 - C_2 + C_3 + C_4 \\ -C_1 + C_2 + C_3 + C_4 \end{pmatrix} = 4\begin{pmatrix} C_1 \\ C_2 \\ C_3 \\ C_4 \end{pmatrix}$$

When an external object approaches or touches a touch panel, the sizes of the coupling capacitances are changed, a touch sensing device senses the change of the sizes of the coupling capacitances, thereby generating touch data indicating the proximity or a touch of the external object.

Figure 4:
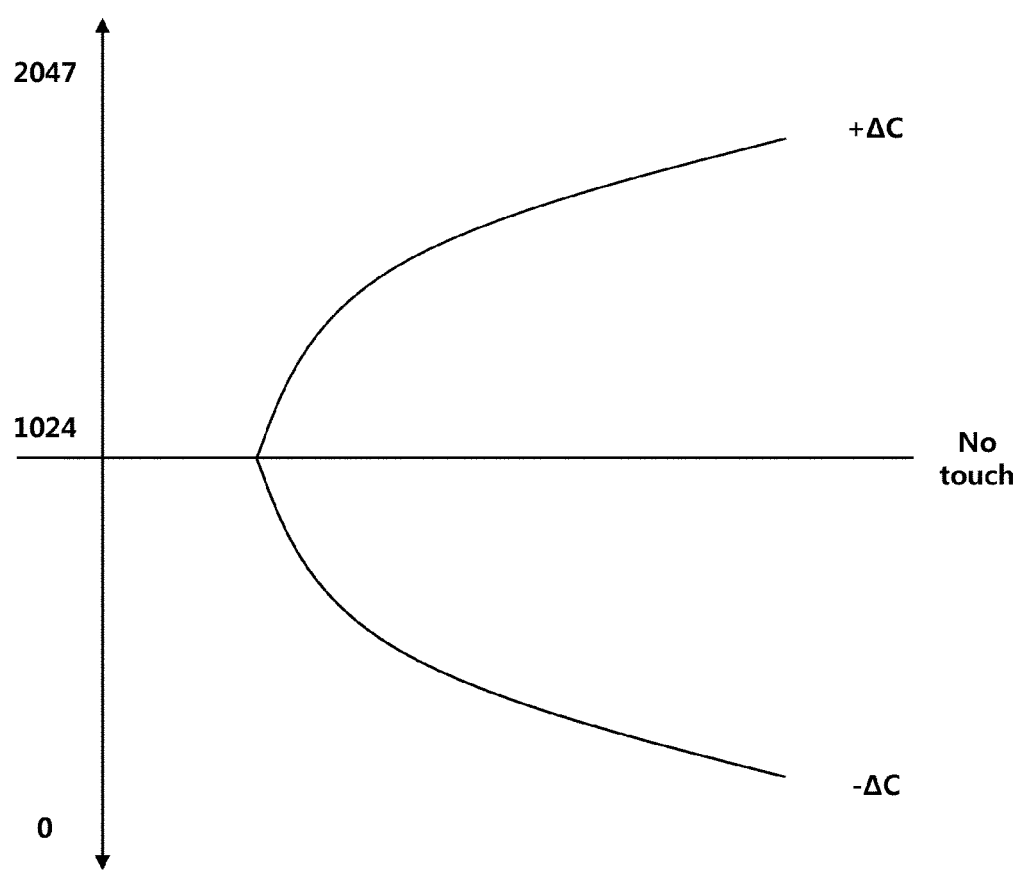
FIG. 4 is a diagram showing a change of sensing data according to the proximity or a touch of an external object.

FIG. 4 is a diagram showing a change of sensing data according to the proximity or a touch of an external object.

The readout circuit of the touch sensing device may convert the change of the size of a coupling capacitance into an analog signal and output the signal to the analog-digital converter. Here, the readout circuit is generally designed to output a median value of a range of values inputted to the analog-digital converter when there is no proximity or touch of an external object. Such design allows, as shown in FIG. 4, the increase or decrease of a coupling capacitance to be efficiently converted in the analog-digital converter without being saturated.

Sensing data Si in an $i^{th}$ sequence reflecting the change of the size of a coupling capacitance may be expressed as equation 4.

$$S_i = M_{i,1}(C_1 + \Delta C_1) + M_{i,1}(C_2 + \Delta C_2) + \ldots + M_{i,1}(C_L + \Delta C_L) \quad \text{[Equation 4]}$$

In a case when perfect codes of 4×4 as a code matrix are used and the sizes of coupling capacitances are equal when there is no proximity or touch of an external object, sensing data may be expressed as the right side of equation 5 and demodulation data may be expressed as the right side of equation 6.

$$\begin{pmatrix} 1 & 1 & 1 & -1 \\ 1 & 1 & -1 & 1 \\ 1 & -1 & 1 & 1 \\ -1 & 1 & 1 & 1 \end{pmatrix} \begin{pmatrix} C + \Delta C_1 \\ C + \Delta C_2 \\ C + \Delta C_3 \\ C + \Delta C_4 \end{pmatrix} = \quad \text{[Equation 5]}$$

$$\begin{pmatrix} 2C + \Delta C_1 + \Delta C_2 + \Delta C_3 - \Delta C_4 \\ 2C + \Delta C_1 + \Delta C_2 - \Delta C_3 + \Delta C_4 \\ 2C + \Delta C_1 - \Delta C_2 + \Delta C_3 + \Delta C_4 \\ 2C - \Delta C_1 + \Delta C_2 + \Delta C_3 + \Delta C_4 \end{pmatrix}$$

$$\left\{\begin{pmatrix} 1 & 1 & 1 & -1 \\ 1 & 1 & -1 & 1 \\ 1 & -1 & 1 & 1 \\ -1 & 1 & 1 & 1 \end{pmatrix}^T \begin{pmatrix} 2C+\Delta C_1+\Delta C_2+\Delta C_3-\Delta C_4 \\ 2C+\Delta C_1+\Delta C_2-\Delta C_3+\Delta C_4 \\ 2C+\Delta C_1-\Delta C_2+\Delta C_3+\Delta C_4 \\ 2C-\Delta C_1+\Delta C_2+\Delta C_3+\Delta C_4 \end{pmatrix}\right\} = $$ [Equation 6]

$$\begin{pmatrix} 4C+4\Delta C_1 \\ 4C+4\Delta C_2 \\ 4C+4\Delta C_3 \\ 4C+4\Delta C_4 \end{pmatrix}$$

The touch sensing device may simultaneously supply driving signals of the same code matrix to a plurality of groups. Here, in order to distinguish driving signals of each group from those of another group, the touch sensing device may supply driving signals having different frequencies to the respective groups.

Figure 5:
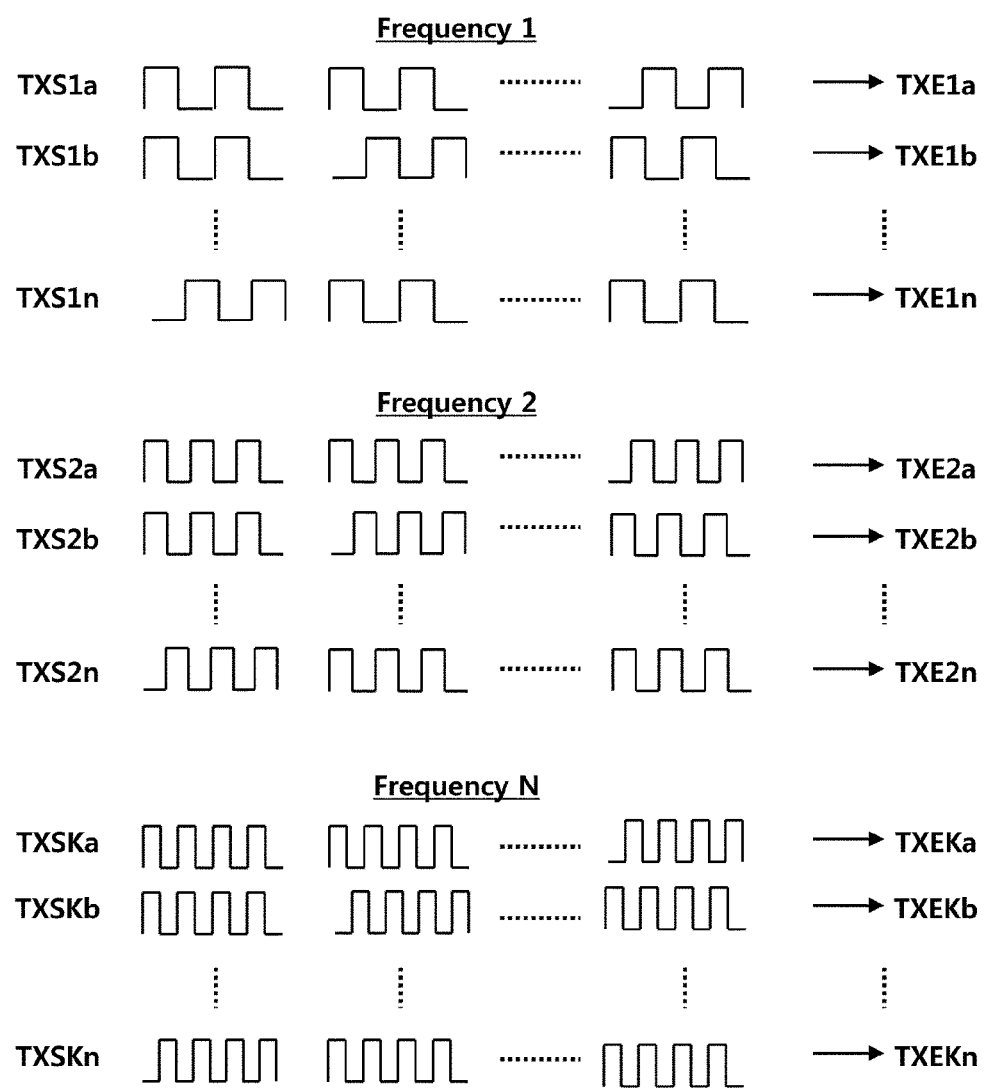
FIG. 5 is diagram showing examples of driving signals according to an embodiment.

FIG. 5 is diagram showing examples of driving signals according to an embodiment.

Referring to FIG. 5, driving signals TXS1a-TXSKn may have different frequencies by group. For example, driving signals TXS1a-TXS1n in a first group may have a first frequency, driving signals TXS2a-TXS2n in a second group may have a second frequency, and driving signals TXSKa-TXSKn in a $K^{th}$ group (K is a natural number, which is 3 or higher) may have a $K^{th}$ frequency. Here, the first frequency, the second frequency, and the $K^{th}$ frequency may all be different. Further, the first frequency, the second frequency, and the $K^{th}$ frequency may be orthogonal.

Although FIG. 5 shows an example in which driving signals have a square waveform, driving signals may have a sinusoidal waveform or a trapezoidal waveform.

The touch sensing device may supply first frequency driving signals TXS1a-TXS1n to transmitting electrodes TXE1a-TXE2n in the first group, second frequency driving signals TXS2a-TXS2n to transmitting electrodes TXE2a-TXE2n in the second group, and $K^{th}$ frequency driving signals TXSKa-TXSKn to transmitting electrodes TXEKa-TXEKn in the $K^{th}$ group. Here, K is a natural number, which is 3 or higher and n is a natural number, which is 2 or higher.

The driving circuit of the touch sensing device may generate such driving signals using a switching circuit or a logic circuit.

Figure 6:
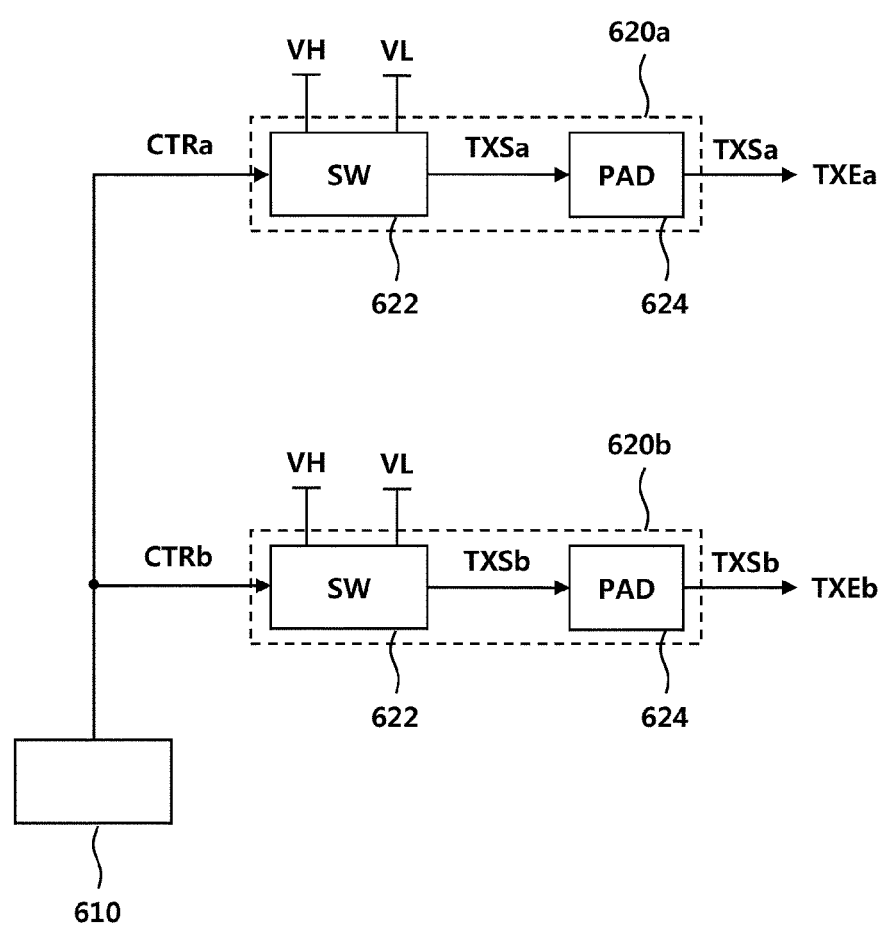
FIG. 6 is a configuration diagram illustrating a first example of a driving circuit according to an embodiment.

FIG. 6 is a configuration diagram illustrating a first example of a driving circuit according to an embodiment.

Referring to FIG. 6, a driving circuit 122a may comprise a plurality of driving channels 620a, 620b and a drive control circuit 610.

Each of the driving channels 620a, 620b may comprise a switching circuit 622 and an output pad 624.

The switching circuit 622 may be connected with a driving high voltage VH and a driving low voltage VL and may selectively output one of the driving high voltage VH and the driving low voltage VL according to drive control signals CTRa, CTRb supplied by the drive control circuit 610. Voltages outputted from the switching circuit 622 may form driving signals TXSa, TXSb and the driving signals TXSa, TXSb may be supplied to transmitting electrodes TXEa, TXEb through the output pad 624.

The drive control circuit 610 may adjust frequencies of the driving signals TXSa, TXSb by controlling switching frequencies of the switching circuits 622 using the drive control signals CTRa, CTRb. In addition, the drive control circuit 610 may control code values of the driving signals TXSa, TXSb by controlling on-off sequences of the switching circuits 622.

Figure 7:
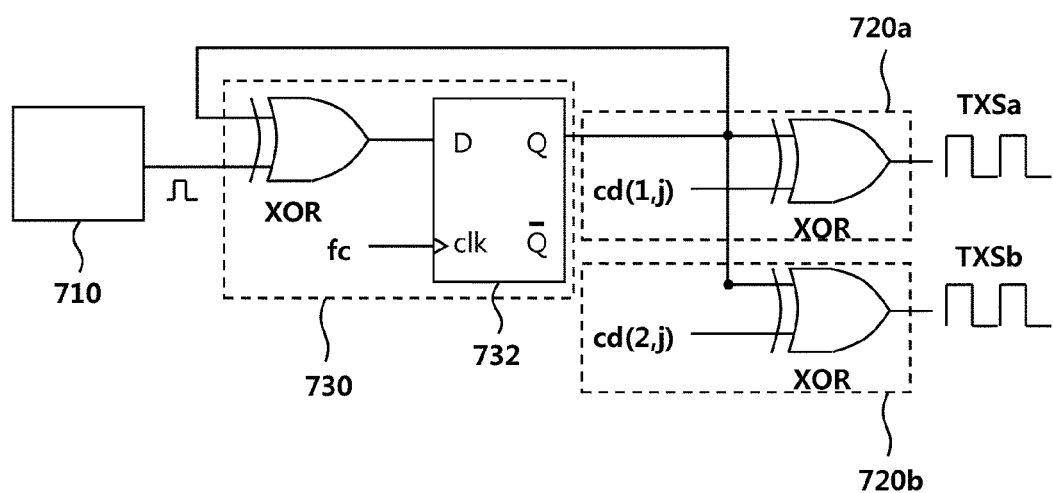
FIG. 7 is a configuration diagram illustrating a second example of a driving circuit according to an embodiment.

FIG. 7 is a configuration diagram illustrating a second example of a driving circuit according to an embodiment.

Referring to FIG. 7, a driving circuit 122b may comprise a square wave generating circuit 710, a plurality of driving channels 720a, 720b, and a T flip-flop circuit 730.

The square wave generating circuit 710 may comprise a counter and output a square wave having a first control frequency to the T flip-flop circuit 730. The T flip-flop circuit 730 may have a clock having a second control frequency and be connected with the square wave generating circuit 710 in its input terminal and with the respective driving channels 720a, 720b in its Q output terminal. Such configuration allows the T flip-flop circuit 730 to supply square waves having control frequencies, corresponding to a result of multiplication of the first control frequency and the second control frequency, to the respective driving channels 720a, 720b.

Here, the T flip-flop circuit 730 may comprise an exclusive OR (XOR) logic element and a D flip-flop circuit 732. A Q output terminal of the D flip-flop circuit 732 may be connected with one input terminal of the XOR logic element and an output terminal of the square wave generating circuit 710 may be connected with the other input terminal of the XOR logic element.

Each of the driving channels 720a, 720b may comprise an XOR logic element. One input terminals of the XOR logic elements may be connected with the Q output terminal of the T flip-flop circuit 730 and through the other input terminals thereof, code values cd(1,j), cd(2,j) or inversed code values may be inputted.

The driving circuit 122b may adjust frequencies of driving signals TXSa, TXSb by controlling the first control frequency and the second control frequency. In addition, the driving circuit 122b may represent codes of the driving signals TXSa, TXSb using the code values cd(1,j), cd(2,j) inputted into the XOR logic elements.

When driving signals, respectively representing different codes or having different frequencies, are supplied to transmitting electrodes, a response signal may undergo complex influences by the respective driving signals. A receiving circuit and a processing circuit of a touch sensing device may receive such a response signal and perform a frequency spectrum analysis and signal decoding in order to separate a signal for each driving signal from the response signal.

Figure 8:
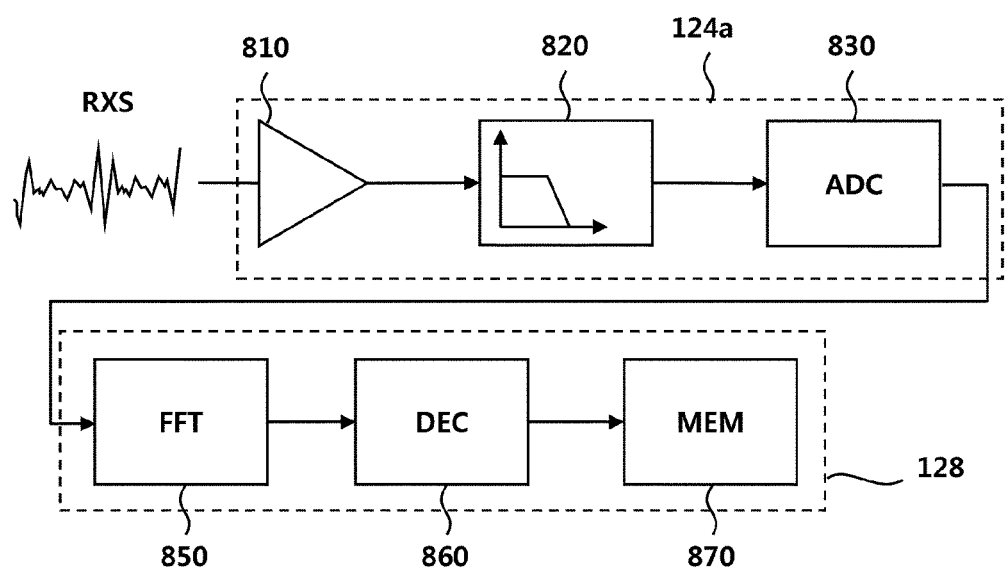
FIG. 8 is a configuration diagram of a first example of a receiving circuit and a processing circuit according to an embodiment.

FIG. 8 is a configuration diagram of a first example of a receiving circuit and a processing circuit according to an embodiment.

Referring to FIG. 8, a receiving circuit 124a may comprise a signal amplifying circuit 810, a filtering circuit 820, and an analog-digital converting circuit 830, and a processing circuit 128 may comprise a frequency spectrum analyzing circuit 850, a decoding circuit 860, and a memory 870.

The signal amplifying circuit 810 may receive a response signal RXS from a receiving electrode and adjust a gain or an offset of the response signal. The filtering circuit 820 may receive a signal outputted from the signal amplifying circuit 810 and remove unnecessary elements from the signal. For example, the filtering circuit 820 may comprise a low pass filter and remove low frequency noise from a signal outputted from the signal amplifying circuit 810. The analog-digital converting circuit 830 may convert an output from the filtering circuit 820 into digital data and transmit it to the processing circuit 128.

The frequency spectrum analyzing circuit 850 may perform a frequency analysis of a response signal using digital data and obtain a first frequency element corresponding to a first frequency and a second frequency element corresponding to a second frequency from an analysis result.

Figure 9:
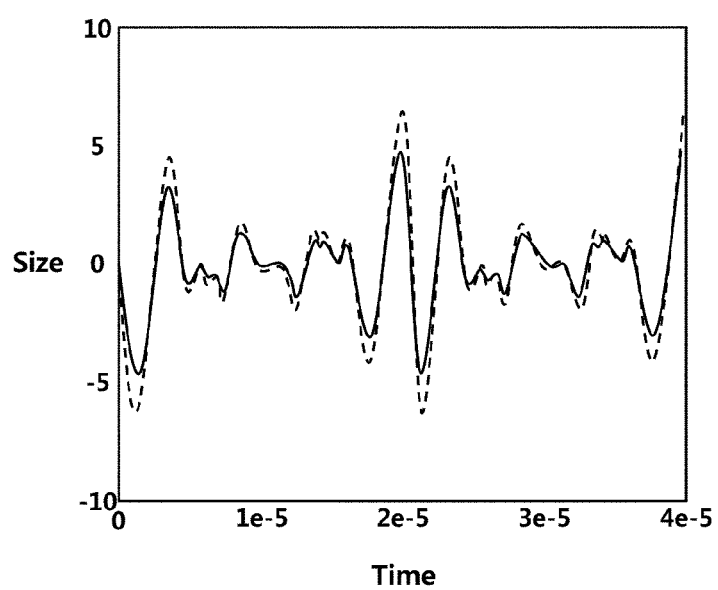
FIG. 9 is an example of a time series graph of a response signal.
Figure 10:
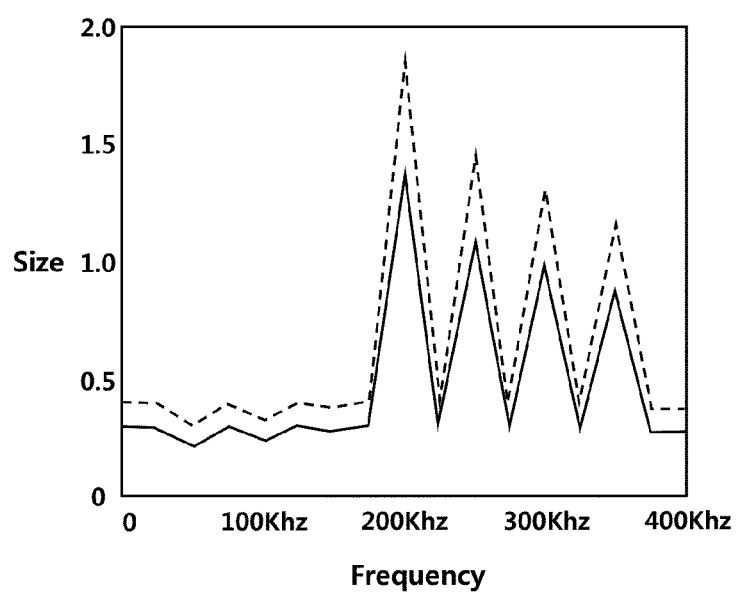
FIG. 10 is an example of a frequency analysis spectrum graph of a response signal.

FIG. 9 is an example of a time series graph of a response signal and FIG. 10 is an example of a frequency analysis spectrum graph of a response signal.

In FIG. 9 and FIG. 10, solid lines are graphs regarding a basic response signal and dotted lines are graphs regarding a response signal when an external object approaches or touches a touch panel. Here, a basic response signal corresponds to a signal formed in a receiving electrode when there is no proximity or touch of an external object.

Referring to FIG. 9, when an external object approaches or touches a touch panel, the size of a response signal may increase as shown by a dotted line. Referring to FIG. 10, when an external object approaches or touches a touch panel, an element value of a specific frequency may increase as shown by a dotted line.

Referring to FIG. 8, FIG. 9, and FIG. 10, the processing circuit 128 may separate a response signal by frequency using element values for respective frequencies obtained by the frequency spectrum analyzing circuit 850.

The decoding circuit 860 may decode the element values for the respective frequencies to separate the response signal by code. Data obtained by separating a response signal by frequency and by code may be stored in the memory as touch raw data for intersection points of transmitting electrodes and a receiving electrode.

The processing circuit 128 may generate touch data including touch coordinates by analyzing the touch raw data and transmit the touch data to the host.

Meanwhile, since the proximity or a touch of an external object does not affect a response signal much, as shown in FIG. 9 and FIG. 10, the touch sensing device may generate touch raw data by extracting data only for the parts where there are differences between the basic response signal and the response signal, that is, where there are influences by the proximity or a touch of an external object.

Figure 11:
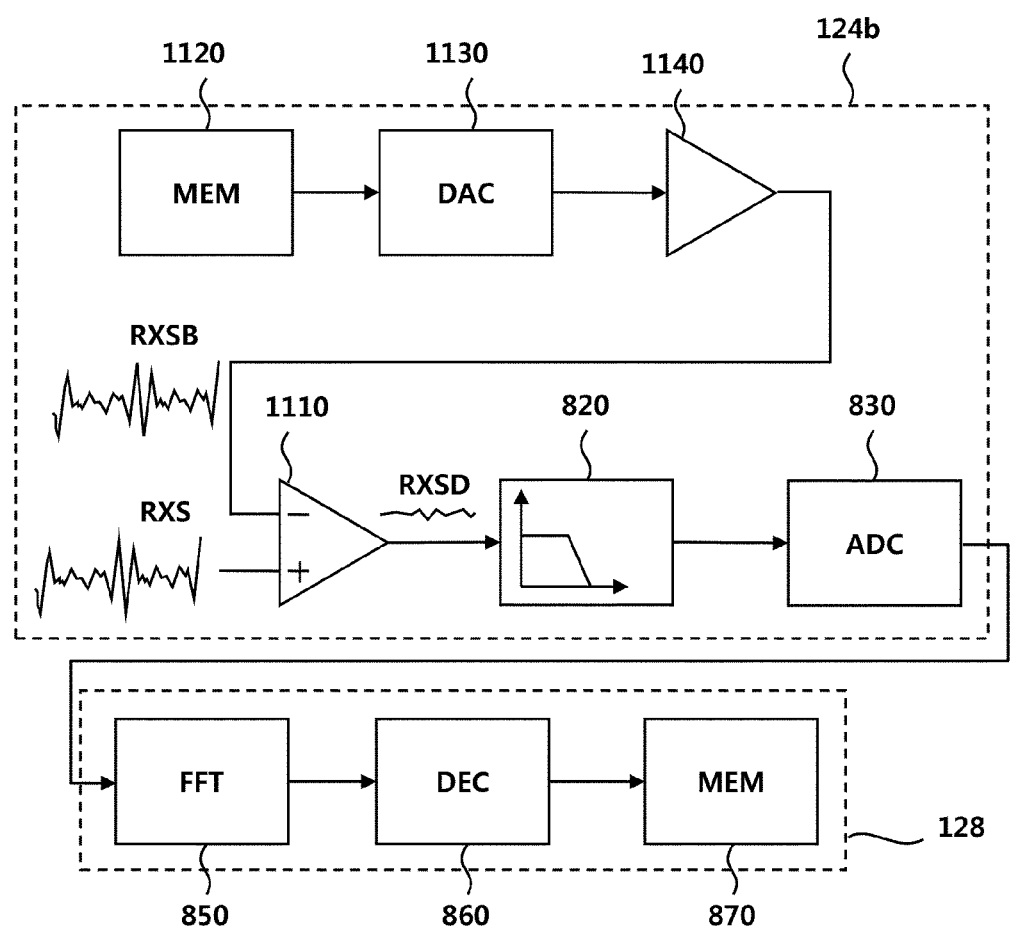
FIG. 11 is a configuration diagram of a second example of a receiving circuit and a processing circuit according to an embodiment.

FIG. 11 is a configuration diagram of a second example of a receiving circuit and a processing circuit according to an embodiment.

Referring to FIG. 11, a receiving circuit 124b may comprise a first memory 1120, a digital-analog converter 1130, a signal amplifying circuit 1140, a signal deducting circuit 1110, a filtering circuit 820, and an analog-digital converting circuit 830 and a processing circuit 128 may comprise a frequency spectrum analyzing circuit 850, a decoding circuit 860, and a memory 870.

The receiving circuit 124b may generate a basic response signal RXSB using the first memory 1120, the digital-analog converter 1130, and the signal amplifying circuit 1140.

In the first memory 1120, a pattern for the basic response signal RXSB may be stored. The digital-analog converter 1130 may receive data regarding the pattern stored in the first memory 1120 and convert the data into an analog signal. The signal amplifying circuit 1140 may generate the basic response signal RXSB by adjusting a gain or an offset of the analog signal.

The signal deducting circuit 1110 may generate a deducted signal RXSD by deducting a basic response signal RXSB from a response signal RXS. The filtering circuit 820 may remove unnecessary elements from the deducted signal RXSD and the analog-digital converting circuit 830 may convert an output from the filtering circuit 820 into digital data and transmit the digital data to the processing circuit 128.

The frequency spectrum analysis circuit 850 may perform a frequency analysis of the response signal using digital data and obtain a first frequency element corresponding to a first frequency and a second frequency element corresponding to a second frequency from an analysis result. The decoding circuit 860 may decode element values for the respective frequencies to separate the response signal by code. Data separated by frequency and by code by such a process may be stored in a second memory 870 as touch raw data for intersection points of transmitting electrodes and a receiving electrode.

Figure 12:
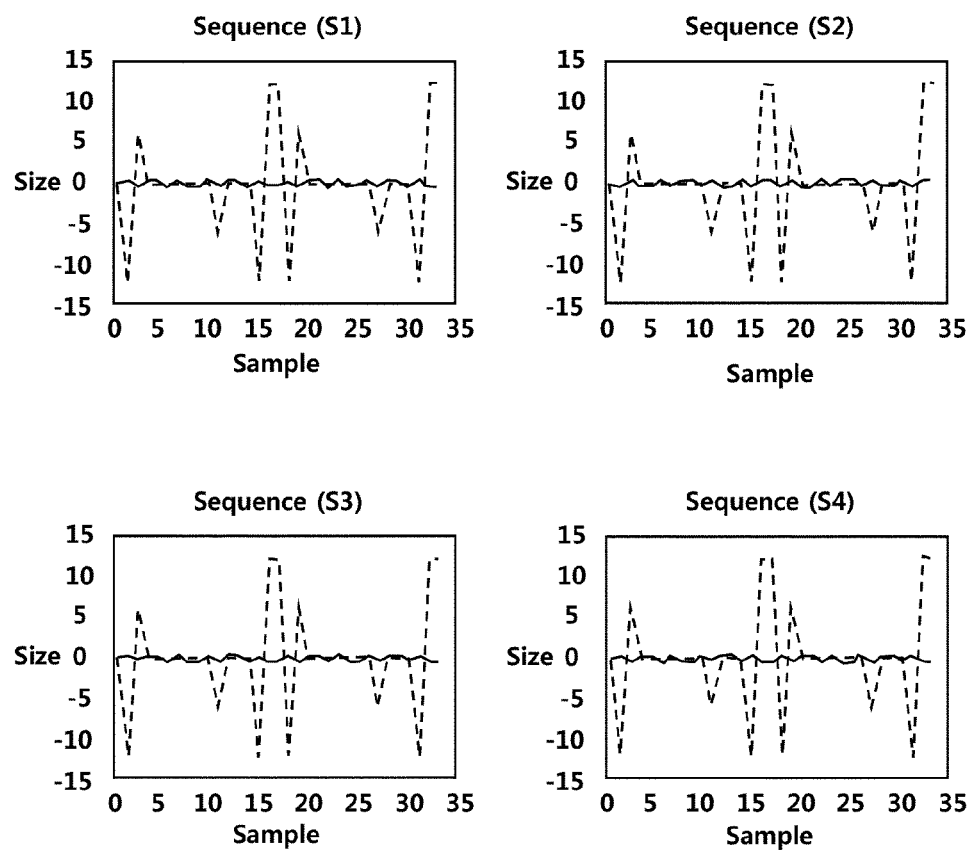
FIG. 12 are examples of time series graphs of a response signal for each code by sequence.
Figure 13:
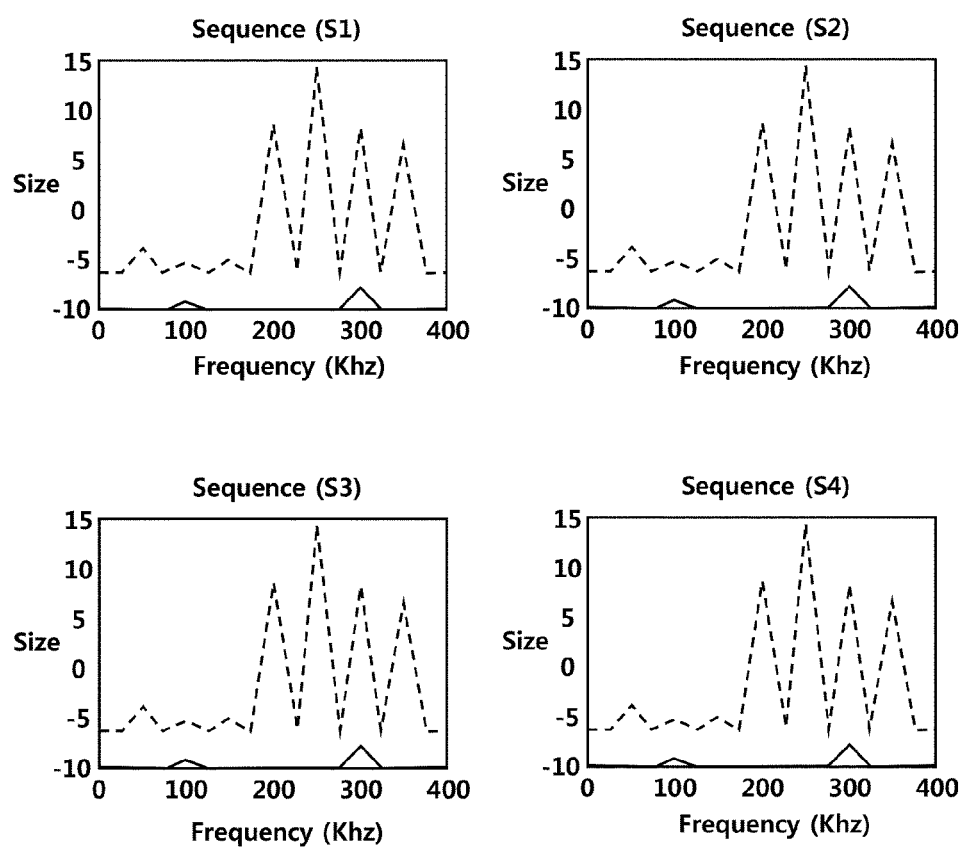
FIG. 13 are examples of frequency analysis spectrum graphs of a response signal for each code by sequence.

FIG. 12 is an example of time series graphs of a response signal for each code by sequence and FIG. 13 is an example frequency analysis spectrum graphs of a response signal for each code by sequence.

As shown in FIG. 12 and FIG. 13, the touch sensing device may receive response signals for respective sequences S1-S4 and perform a frequency analysis of each response signal. In addition, the touch sensing device may decode each response signal using a frequency analysis value obtained for each sequence S1-S4.

In FIG. 12 and FIG. 13, graphs in dotted lines show response signals from which basic response signals are not deducted and graphs in solid lines show deducted signals obtained by deducting basic response signals from the response signals. As shown in FIG. 12 and FIG. 13, the deducted signals have lower levels than those of the response signals and unnecessary frequency elements are removed. Accordingly, sensing performance may be improved.

Figure 14:
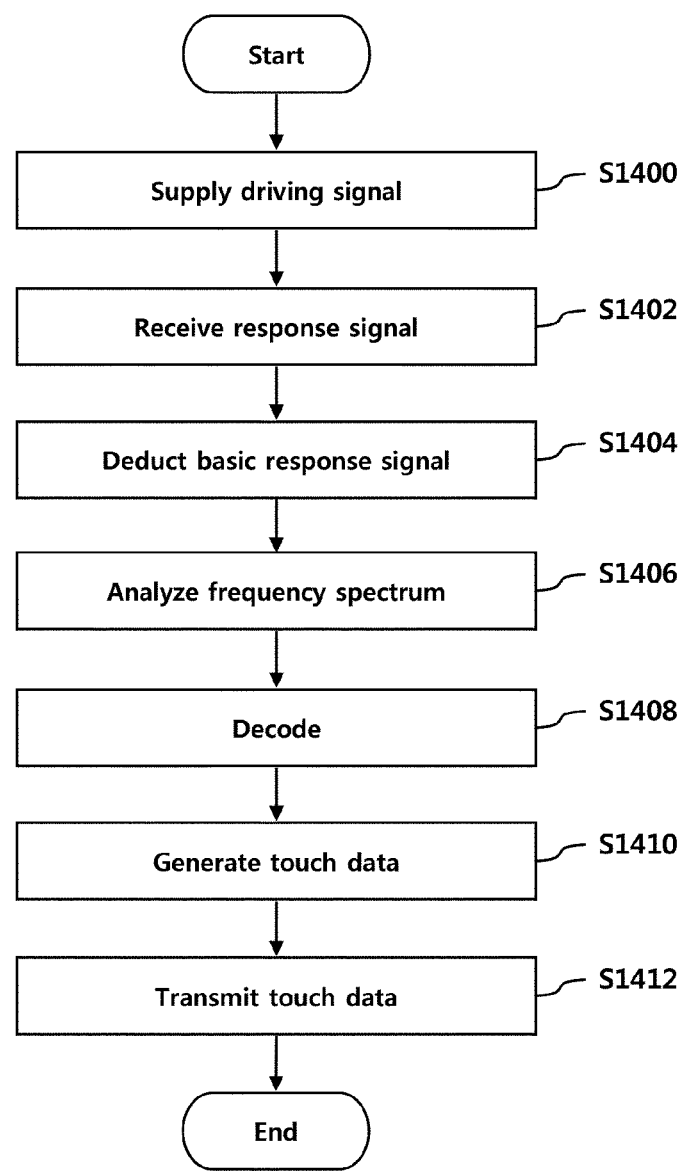
FIG. 14 is a flow diagram of a touch sensing method according to an embodiment.

FIG. 14 is a flow diagram of a touch sensing method according to an embodiment.

Referring to FIG. 14, the touch sensing device may supply a plurality of first frequency driving signals, having a first frequency and respectively representing different codes and a plurality of second frequency driving signals having a second frequency and respectively representing different codes, to transmitting electrodes (S1400). Here, the first frequency and the second frequency may be different from each other and orthogonal to each other. Additionally, codes applied to the first frequency driving signals or the second frequency driving signals may be orthogonal to each other and may be perfect codes.

The touch sensing device may receive a response signal to the plurality of first frequency driving signals and the plurality of second frequency driving signals from a receiving electrode coupled with the transmitting electrodes by capacitances (S1402).

The touch sensing device may generate a deducted signal by deducting a basic response signal from a response signal (S1404).

The touch sensing device may obtain element values for respective frequencies by a frequency spectrum analysis of the deducted signal (S1406). Here, the touch sensing device may perform frequency spectrum analyses for respective sequences of the codes.

The touch sensing device may decode the element values for the respective frequencies to obtain touch raw date for each frequency and each code and store the touch raw data in the memory.

The touch sensing device analyze the touch raw data to generate touch data including touch coordinates (S1410) and transmit the touch data to the host (S1412).

Figure 15:
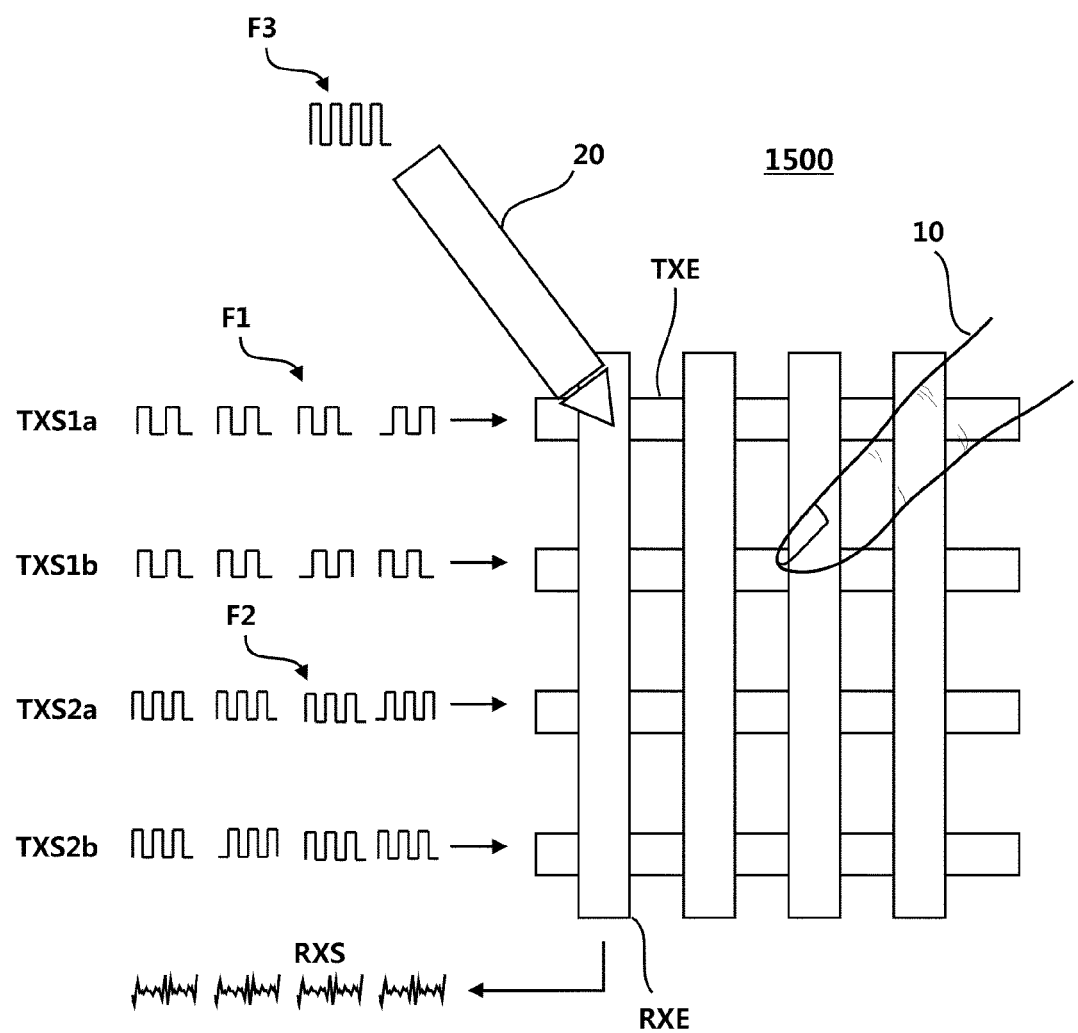
FIG. 15 is a diagram illustrating an example of a touch system to which an active touch pen is added.

FIG. 15 is a diagram illustrating an example of a touch system to which an active touch pen is added.

Referring to FIG. 15, an active touch pen 20 in addition to a finger 10 as an external object may be applied to a touch system 1500.

The touch sensing device may supply a plurality of first frequency driving signals TXS1a, TXS1b having a first frequency and a plurality of second frequency driving signals TXS2a, TXS2b having a second frequency to transmitting electrodes TXE. The touch sensing device may receive a response signal RXS from a receiving electrode RXE coupled with the transmitting electrodes by capacitances and generate touch raw data for intersection points of the transmitting electrodes and the receiving electrode by a frequency analysis of the response signal RXS.

Meanwhile, to the receiving electrode RXE, a downlink signal from the active touch pen 20 may be transmitted. The active touch pen 20 may transmit a downlink signal of a third frequency different from the first frequency and the second frequency to the receiving electrode RXE. Such a downlink signal may affect the response signal RXS.

The touch sensing device may obtain a first frequency element corresponding to the first frequency and a second frequency element corresponding to the second frequency from the response signal RXS by a frequency analysis of the response signal and generate touch raw data for intersection points of the transmitting electrodes and the receiving electrode using the first frequency element and the second frequency element.

In addition, the touch sensing device may extract a signal corresponding to a third frequency from the response signal RXS to recognize a downlink signal from the active touch pen 20. Here, the touch sensing device may extract the signal corresponding to the third frequency from the response signal RXS using a band-pass filter or in another method.

According to such a method, a touch by a finger as well as a touch by an active pen may simultaneously be detected.

What is claimed is:

1. A touch sensing device comprising:
a driving circuit to supply to transmitting electrodes a plurality of first frequency driving signals having a first frequency and respectively representing different codes, and a plurality of second frequency driving signals having a second frequency and respectively representing different codes, wherein each of the transmitting electrodes is identified by frequency driving signals orthogonal to each other and codes orthogonal to each other;
a receiving circuit to receive a response signal from a receiving electrode coupled with the transmitting electrodes by capacitances; and
a processing circuit to obtain a first frequency element corresponding to the first frequency and a second frequency element corresponding to the second frequency from the response signal, and decode the first frequency element and the second frequency element to generate touch raw data for intersection points of the transmitting electrodes and the receiving electrode,
wherein the processing circuit extracts the first frequency element and the second frequency element from a signal obtained by deducting a basic response signal from the response signal, wherein the basic response signal corresponds to a signal formed in the receiving electrode when there is no proximity or touch of an external object,
wherein the basic response signal is generated according to a pattern previously stored in a memory,
wherein the basic response signal is generated by converting data for the pattern stored in the memory into an analog signal and adjusting a gain or an offset of the analog signal.

2. The touch sensing device of claim 1, wherein the first frequency and the second frequency are orthogonal to each other and the plurality of first frequency driving signals comprise codes orthogonal to each other.

3. The touch sensing device of claim 1, wherein the processing circuit obtains the first frequency element and the second frequency element using a Fast Fourier Transform (FFT).

4. The touch sensing device of claim 1, wherein a matrix of codes represented by the first frequency driving signals is identical to a matrix of codes represented by the second frequency driving signals.

5. The touch sensing device of claim 4, the matrix of codes is a matrix of perfect codes.

6. The touch sensing device of claim 1, wherein the driving circuit comprises a switching circuit to selectively output a driving high voltage or a driving low voltage and a drive control circuit to supply a drive control signal to the switching circuit and generates the first frequency driving signals and the second frequency driving signals by controlling the switching circuit according to the drive control signal.

7. A touch sensing device comprising:
a driving circuit to supply to transmitting electrodes a plurality of first frequency driving signals having a first frequency and respectively representing different codes, and a plurality of second frequency driving signals having a second frequency and respectively representing different codes, wherein each of the transmitting electrodes is identified by frequency driving signals orthogonal to each other and codes orthogonal to each other;
a receiving circuit to receive a response signal from a receiving electrode coupled with the transmitting electrodes by capacitances; and
a processing circuit to obtain a first frequency element corresponding to the first frequency and a second frequency element corresponding to the second frequency from the response signal, and decode the first frequency element and the second frequency element to generate touch raw data for intersection points of the transmitting electrodes and the receiving electrode,
wherein the driving circuit generates the first frequency driving signals and the second frequency driving signals using an exclusive OR (XOR) logic element into one input terminal of which a square wave having a specific frequency is inputted and into another terminal of which a code value or an inversed code value is inputted.

8. A method of sensing a touch, comprising:
generating a plurality of first frequency driving signals and a plurality of second frequency driving signals using an exclusive OR (XOR) logic element into one input terminal of which a square wave having a specific frequency is inputted and into another terminal of which a code value or an inversed code value is inputted;
supplying to transmitting electrodes the plurality of first frequency driving signals having a first frequency and respectively representing different codes, and the plurality of second frequency driving signals having a second frequency and respectively representing different codes, wherein each of the transmitting electrodes is identified by frequency driving signals orthogonal to each other and codes orthogonal to each other;

receiving a response signal to the plurality of first frequency driving signals and the plurality of second frequency driving signals from a receiving electrode coupled with the transmitting electrodes by capacitances;

obtaining a first frequency element corresponding to the first frequency and a second frequency element corresponding to the second frequency from the response signal;

decoding the first frequency element and the second frequency element to generate touch raw data for intersection points of the transmitting electrodes and the receiving electrode; and analyzing the touch raw data to generate touch data including touch coordinates.

9. The method of sensing a touch of claim 8, wherein the first frequency element and the second frequency element are respectively obtained by extracting the first frequency element and the second frequency element from a signal obtained by deducting a basic response signal from the response signal, wherein the basic response signal corresponds to a signal formed in the receiving electrode when there is no proximity or touch of an external object.

* * * * *